United States Patent [19]

Kim et al.

[11] Patent Number: 5,541,660
[45] Date of Patent: Jul. 30, 1996

[54] SYSTOLIC REALIZATION OF MOTION COMPENSATED INTERPOLATION FILTER

[75] Inventors: Jong-Hoon Kim; Keun-Hwan Kim, both of Seoul; Sang-Hoon Cheon, Kyeongki-do; Byeong-Uk Lee, Seoul, all of Rep. of Korea

[73] Assignee: Daewoo Electronics Co., Ltd., Seoul, Rep. of Korea

[21] Appl. No.: 270,137

[22] Filed: Jul. 1, 1994

[30] Foreign Application Priority Data

Dec. 24, 1993 [KR] Rep. of Korea ............... 93-29434

[51] Int. Cl.⁶ ..................................... H04N 7/32
[52] U.S. Cl. .................................. 348/416; 348/699
[58] Field of Search ........................... 348/413, 412, 348/416, 429, 699, 384, 390, 409, 407; H04N 7/137

[56] References Cited

U.S. PATENT DOCUMENTS

| | | | |
|---|---|---|---|
| 4,862,266 | 8/1989 | Gillard | 348/699 |
| 4,862,267 | 8/1989 | Gillard et al. | 348/416 |
| 4,864,394 | 9/1989 | Gillard | 348/699 |
| 4,873,573 | 10/1989 | Thomas et al. | 348/416 |
| 4,901,149 | 2/1990 | Fernando et al. | 348/429 |
| 4,937,666 | 6/1990 | Yang | 348/413 |
| 4,989,089 | 1/1991 | Chantelou et al. | 348/416 |
| 5,068,727 | 11/1991 | Haghiri et al. | 348/412 |
| 5,072,293 | 12/1991 | De Haan et al. | 348/699 |
| 5,280,350 | 1/1994 | De Haan et al. | 348/699 |
| 5,347,312 | 9/1994 | Saunders et al. | 348/699 |

*Primary Examiner*—Thai Q. Tran
*Assistant Examiner*—Richard Lee
*Attorney, Agent, or Firm*—William F. Pinsak

[57] ABSTRACT

A motion compensated interpolation filter calculates an interpolated frame between two input frames of video signals having moving objects therein. The interpolation filter includes two 2-dimensional filter which are identical in structure. Each of the 2-dimensional filters has a 2-dimensional systolic array structure for providing a weighted sum of 4 pixels of each of the input frames, respectively. Each of the 2-dimensional filter includes $(2N+1) \cdot (2N+1)$ identical processing elements, and each of a block of $(2N+1) \cdot (2N+1)$ pixels is inputted to each of the processing elements, and each of the processing elements generates filter coefficients, to be multiplied to a corresponding pixel values. Since the systolic array structure inherently incorporates modularity and regularity therein, the interpolation filter is suitable for real-time processing with easy hardware implementation.

1 Claim, 10 Drawing Sheets

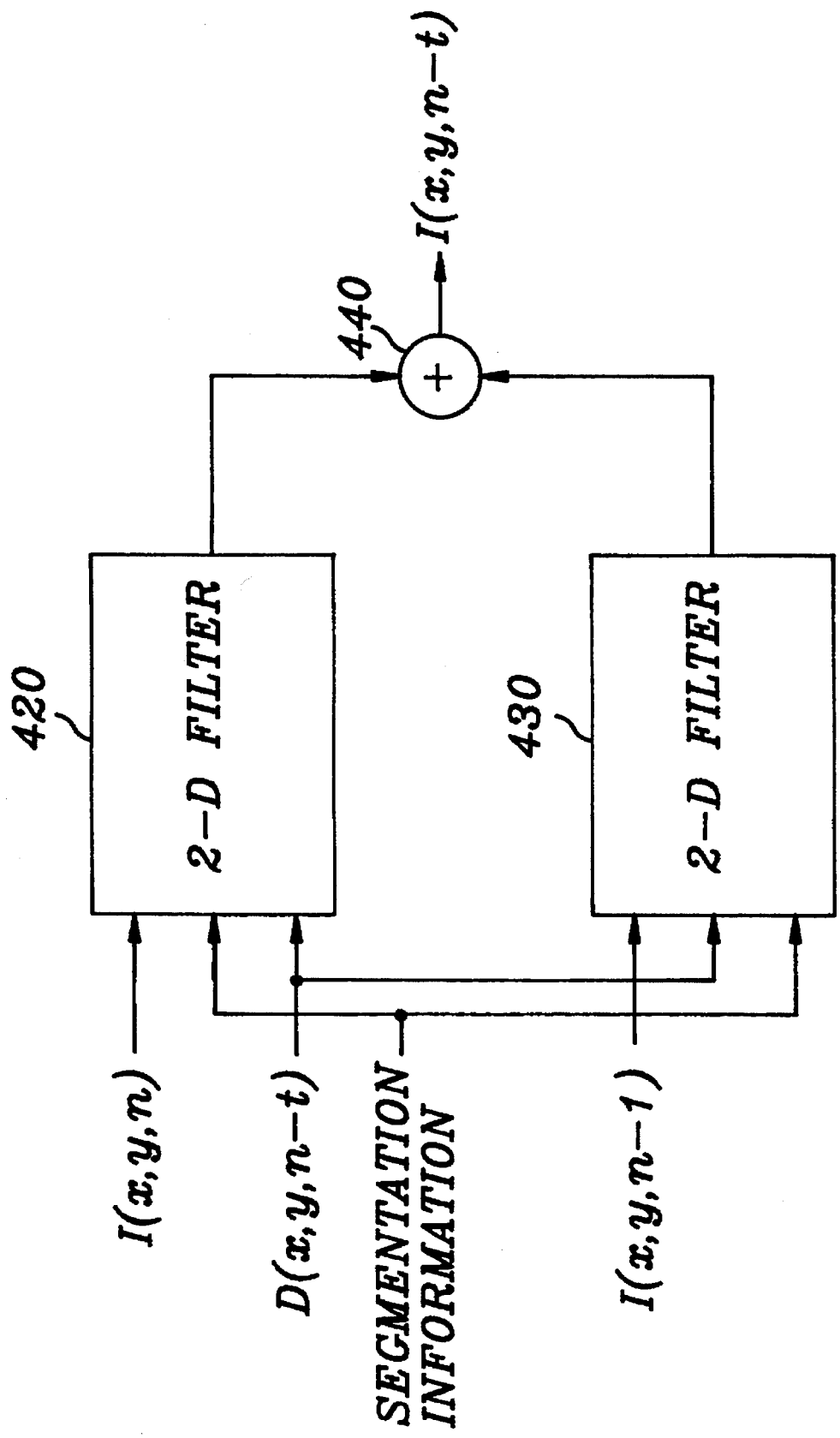

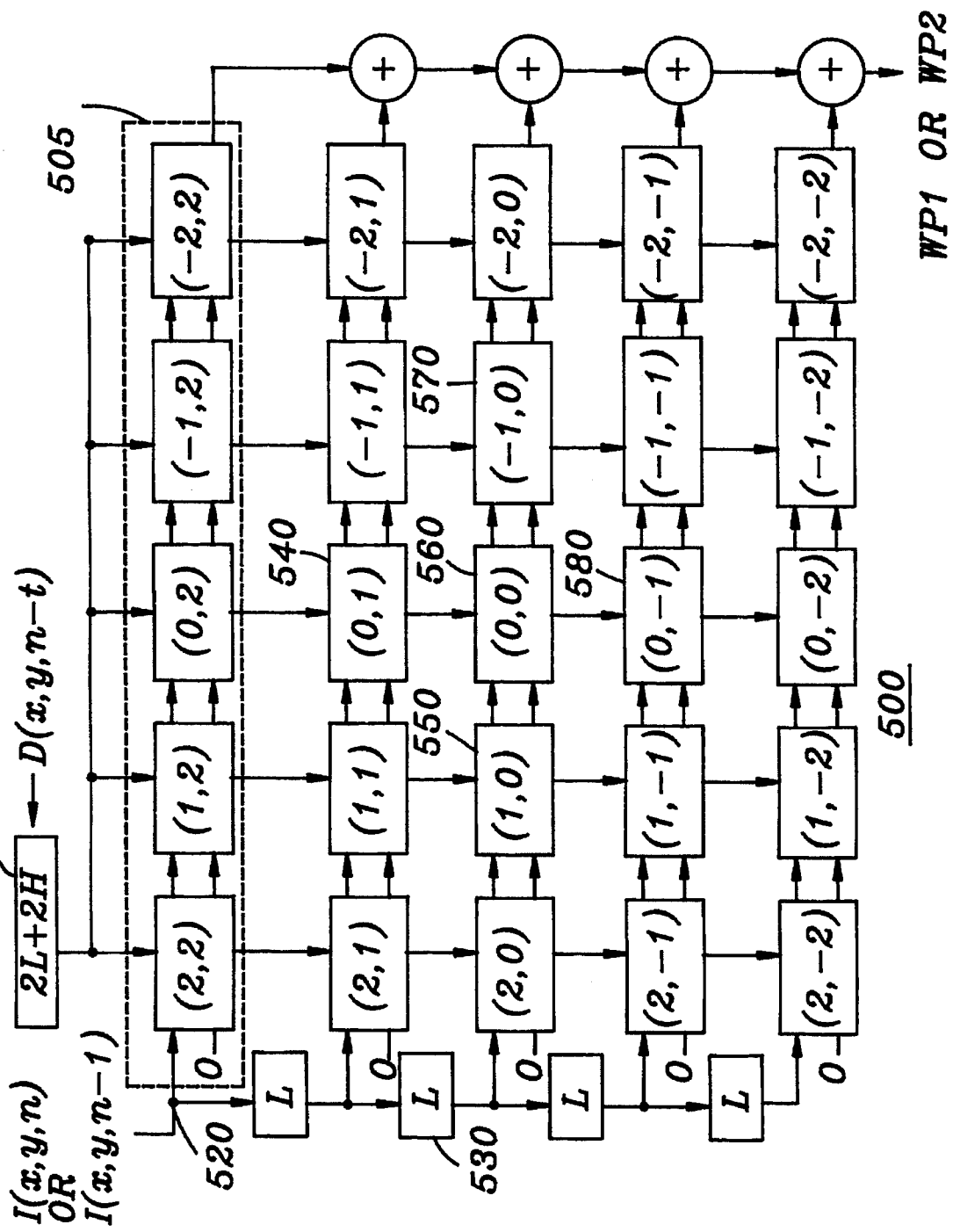

SYSTOLIC REALIZATION OF MOTION COMPENSATED INTERPOLATION FILTER

FIELD OF THE INVENTION

The present invention is related to a digital video codec system; and, more particularly, to a temporal interpolation filter implemented by using a systolic array for real-time interpolation.

DESCRIPTION OF THE PRIOR ART

In a digital video codec (encoder and decoder) system having low transmission rates, compression of a large amount of digital data is required for transmitting video signals through the transmission channel of a limited bandwidth and, therefore, various compression techniques have been proposed to reduce the substantial amount of the transmission data.

One of the simplest ways to carry out the compression is called the frame skipping method. In the frame skipping method, the amount of transmission data is reduced by encoding and transmitting only selected frames of a video signal and skipping the remaining frames therebetween. The skipped frames are then reconstructed at the receiver end through the use of a temporal interpolation technique.

However, when a motion of a moving object is not considered during the temporal interpolation process, it results in blearing of the moving object in the interpolated frames, and, therefore, in such a case, the motion estimation of the moving object and the motion vector thereof must be incorporated for more accurate interpolation. A temporal interpolation adopting motion estimation and motion vectors is referred to as the motion compensated interpolator (MCI). More detailed description of the MCI is described in Kim, J. S. et al, "Local Motion Adaptive Interpolation Technique Based on Block Matching Algorithm", *Signal Processing: Image Communication*, Vol. 4, No. 6, pp. 519–528 (November 1992) and in Ciro Cafforio, Fabic Rocca, Stafan Tubara. "Motion compensated Image Interpolation", *IEEE Transections on Communications*, Vol. 38, No. 2 (February 1990).

Referring to FIG. 1, there is shown a block diagram of a conventional MCI which comprises a motion estimator 120, a change detection block 130, a segmentation block 140 and an interpolation filter 150. A transmitted digital signal is inputted to the motion estimator 120, the change detection block 130 and the interpolation filter 150. The motion estimator 120 determines a motion vector of a moving object from the current frame and its previous frame of the transmitted digital video signal through the use of, e.g., a block matching algorithm. The determined motion vector of the moving object is assigned as the motion vector for each of the pixels included in the moving object projected on a frame to be interpolated and transferred to the segmentation block 140 and the interpolation filter 150. The change detection block 130 determines the frame difference between the current and previous frames resulting from the motion of the moving object thereby dispatching a change detection information representing the frame difference to the segmentation block 140. In response to the motion vectors from the motion estimator 120 and the change detection information from the change detection block 130, the segmentation block 140 generates the segmentation information by classifying each pixel in the frame to be interpolated into one of a stationary, moving, covered or a uncovered area. The segmentation information for each of the pixels of the frame to be interpolated is then applied to the interpolation filter 150. In response to the motion vector and the segmentation information, the interpolation filter 150 generates the interpolated frame from the current and previous frames to thereby provide an interpolated digital video signal thereof. Details of the interpolation filter 150 will be described with reference to FIGS. 2 and 3.

FIG. 2 depicts the segmentation method carried out by the segmentation block 140, wherein a nth frame represents the current frame; a (n−1)th frame, the previous frame; and a (n−t)th frame, the frame to be interpolated with t being a real number ranging from 0 to 1. Shaded areas in the nth frame and the (n−1)th frame indicate the moving object 200 and the arrows represent the motion vectors assigned to each pixel of the moving object 200 projected on the (n−t)th frame. All of the motion vectors are identical and correspond to the motion of moving object 200. The motion vector $D(z, n-t)$ represents the one passing through a pixel located at z on the (n−t)th frame, whereas $z_D$ and $z_D'$ represent the intersection points between the motion vector $D(z, N-t)$ and nth and (n−1)th frames, respectively. The shaded area on the lower portion of the FIG. 2 indicates the change detection information representing the frame difference between the current frame and its previous frame caused by the motion of the moving object 200.

Based on the change detection information and motion vectors, the segmentation block 140 in FIG. 1 divides pixels of the (n−t)th frame into one of the four areas. That is, if an area has no moving objects in both the nth and (n−1)th frame, this area shown as A1 in FIG. 2 is classified into the station area (SA) and if the area corresponds to the moving object 200 projected on the (n−t)th frame, this area, shown as A3 in FIG. 2, is classified into the moving area (MA). If a new area, shown as A2 in FIG. 2, appears in the (n−t)th frame from the behind of the moving object, this area is classified into the uncovered area (UA), and if an area, shown as A4 in FIG. 2, which exists in the (n−t)th frame, is vanished in the nth frame, then this area is classified into the covered area (CA).

Interpolation of the (n−t)th frame carried out by the interpolation filter 150 shown in FIG. 1 can be described as follows:

(a) Stationary Area $$I(z, n-t) = t \cdot I(z, n-1) + (1-t) \cdot I(z, n) \qquad \text{Eq. (1)}$$

wherein $I(z, n-t)$ is a pixel value, e.g., a luminance level, of a pixel residing at a pixel position z in the (n−t)th frame; $I(z, n-1)$, a pixel value at the same pixel position z on the (n−1)th frame; and $I(z, n)$, a pixel value at the same pixel position z in the nth frame. That is, $I(z, n-t)$ included in the stationary area is obtained from the pixels at the same position z on the nth and (n−1)th frames by applying inversely proportional weight factors thereto.

(b) Uncovered Area $$I(z, n-t) = I(z, n) \qquad \text{Eq. (2)}$$

That is, a pixel value at a pixel position z in the uncovered area of the (n−t)th frame is identical to the pixel value of the pixel located at the same position z on the nth frame.

(c) Covered Area $$I(z, n-t) = I(z, n-1) \qquad \text{Eq. (3)}$$

The pixel value at a pixel position z in the covered area of the (n−t)th frame is the same as the pixel value at the same position z on the (n−1)th frame.

(d) Moving Area

The interpolation filter 150 evaluates an interpolated pixel value at a pixel position z in the (n–t)th frame from pixel values at $z_0$ in the nth frame and at $z_D{'}$ in the (n–1)th frame, which can be described as:

$$I(z, n-t) = t \cdot I(z_D{'}, n-1) + (1-t) \cdot I(z_D, n) \quad \text{Eq. (4)}$$

wherein $z_D{'}$ and $z_D$ are the intersection points in the (n–1)th and the nth frames, respectively, which are generated by the motion vector D(z, n–t) passing through the pixel position z on the (n–t)th frame ith $z_D{'} = z+(1-t) \cdot D(z, n-t)$ and $z_D = z - t \cdot D(z, n-t)$; I(z, n–t) is the interpolated pixel value at the pixel position z in the (n–t)th frame; $I(z_D{'}, n-1)$, the pixel value at $z_D{'}$ in the (n–1)th frame; and $I(z_D, n)$, the pixel value at $z_D$ in the nth frame. If the motion vector D(z, n–t) is zero, Eq. (4) reduces to Eq. (1).

As shown in FIG. 3, the intersection points $z_D$ in the nth frame and $z_D{'}$ in the (n–1)th frame may not coincide with exact pixel positions, but may be located in the middle of the pixels. In such a case, the weighted sum of neighboring four points is used for the calculation of $I(z+(1-t) \cdot D(z, n-t), n-1)$ or $I(z - t \cdot D(z, n-t), n)$. In FIG. 3, $z_1, z_2, z_3$ and $z_4$ denote the neighboring four points of $z_D$ in the nth frame, while $z_1{'}, z_2{'}, z_3{'}$ and $z_4{'}$ are the neighboring four points of $z_D{'}$ in the (n–1)th frame. $\Delta_x$ and $\Delta_x{'}$ are the displacements of $z_D$ and $z_D{'}$ from $z_1$ and $z_1{'}$ in the x direction, respectively. Similarly, $\Delta_y$ and $\Delta_y{'}$ denote the displacements of $z_D$ and $z_D{'}$ from $z_1$ and $z_1{'}$ in the y direction, respectively.

In this case, the interpolated pixel value at $z_D$ in the nth frame may be defined as:

$$I(z - t \cdot D(z, n-t), n) = \quad \text{Eq. (5)}$$

$$(1 - \Delta_x) \cdot (1 - \Delta_y) \cdot I(z_1, n) +$$

$$\Delta_x \cdot (1 - \Delta_y) \cdot I(z_2, n) +$$

$$(1 - \Delta_x) \cdot \Delta_y \cdot I(z_3, n) + \Delta_x \cdot \Delta_y \cdot I(z_4, n)$$

Similarly, the interpolated pixel value at $z_D{'}$ in the (n–1)th frame may be defined as:

$$I(z + (1 - t) \cdot D(z, n-t), n - 1) = \quad \text{Eq. (6)}$$

$$(1 - \Delta_x{'}) \cdot (1 - \Delta_y{'}) \cdot I(z_1{'}, n - 1) +$$

$$\Delta_x{'} \cdot (1 - \Delta_y{'}) \cdot I(z_2{'}, n - 1) +$$

$$(1 - \Delta_x{'}) \cdot \Delta_y{'} \cdot I(z_3{'}, n - 1) - \Delta_x \cdot \Delta_y{'} \cdot I(z_y{'}, n - 1)$$

As can be seen from Eqs. (4) to (6), the interpolation filter 150 must carry out, within a pixel clock, such a multitude of operations as the determination of the locations $z_D$ and $z_D{'}$, the derivation of $z_1$ to $z_4$ around $z_D$ and $z_1{'}$ to $z_4{'}$ around $z_D{'}$, the memory access operation of the pixel values of $z_1$ to $z_4$ and $z_1{'}$ to $z_4{'}$ from the frame memory, the interpolation of the pixel value at $z_D$ from the pixel values of $z_1$ to $z_4$ in the nth frame, the interpolation of the pixel value at $z_D{'}$ from the pixel values of $z_1{'}$ to $z_4{'}$ in the (n–1)th frame, and the interpolation of pixel value at z in the (n–t)th frame using the weighted sums of $z_D$ and $z_D{'}$.

Therefore, the realization of the real-time motion compensated interpolation filter requires one or more of very fast microprocessors and such special and costly frame memory as high speed RAM (read only memory) or multi-port RAM.

SUMMARY OF THE INVENTION

It is, therefore, a primary object of the present invention to provide a real-time motion compensated interpolation filter capable of reducing the calculation steps and interpolation time substantially by employing a systolic array structure.

In accordance with the present invention, there is provided a motion compensated interpolation filter for generating interpolated frame from a current frame and its preceding frame of video signals through the use of a segmentation information and a motion vector for each of the pixels in the interpolated frame, which comprises:

a first means having a 2-dimensional systolic array structure, which includes (2N+1)·(2N+1) first identical processing elements, for providing a first weighted pixel value from the current frame in response to said segmentation information and said motion vector, each of said first identical processing elements having means for generating one of first filter coefficients in response to the motion vector and means for multiplexing a pixel value of the current frame, said one of the first filter coefficients and zero in response to the segmentation information;

a second means having said 2-dimensional systolic array structure, which includes (2N+1)·(2N+1) second identical processing elements, for providing a second weighted pixel value from the preceding frame in response to said segmentation information and said motion vector, each of said second identical processing elements having means for generating one of second filter coefficients in response to the motion vector and means for multiplexing a pixel value of the current frame, said one of the second filter coefficients and zero in response to the segmentation information; and means for adding said first and second weighted pixel values to thereby generate an interpolated pixel value corresponding to each of the pixels of the interpolated frame.

BRIEF DESCRIPTION OF THE DRAWINGS

The above and other objects and features of the present invention will become apparent from the following description of preferred embodiments given in conjunction with the accompanying drawings, in which;

FIG. 4 provides a block diagram of a motion compensated interpolation filter in accordance with the present invention;

FIGS. 5a and 5b represent a 2-dimensional filter having a systolic array structure and a processing element thereof, respectively, in accordance with a first embodiment of the present invention;

DETAILED DESCRIPTION OF THE INVENTION

Figure 1:
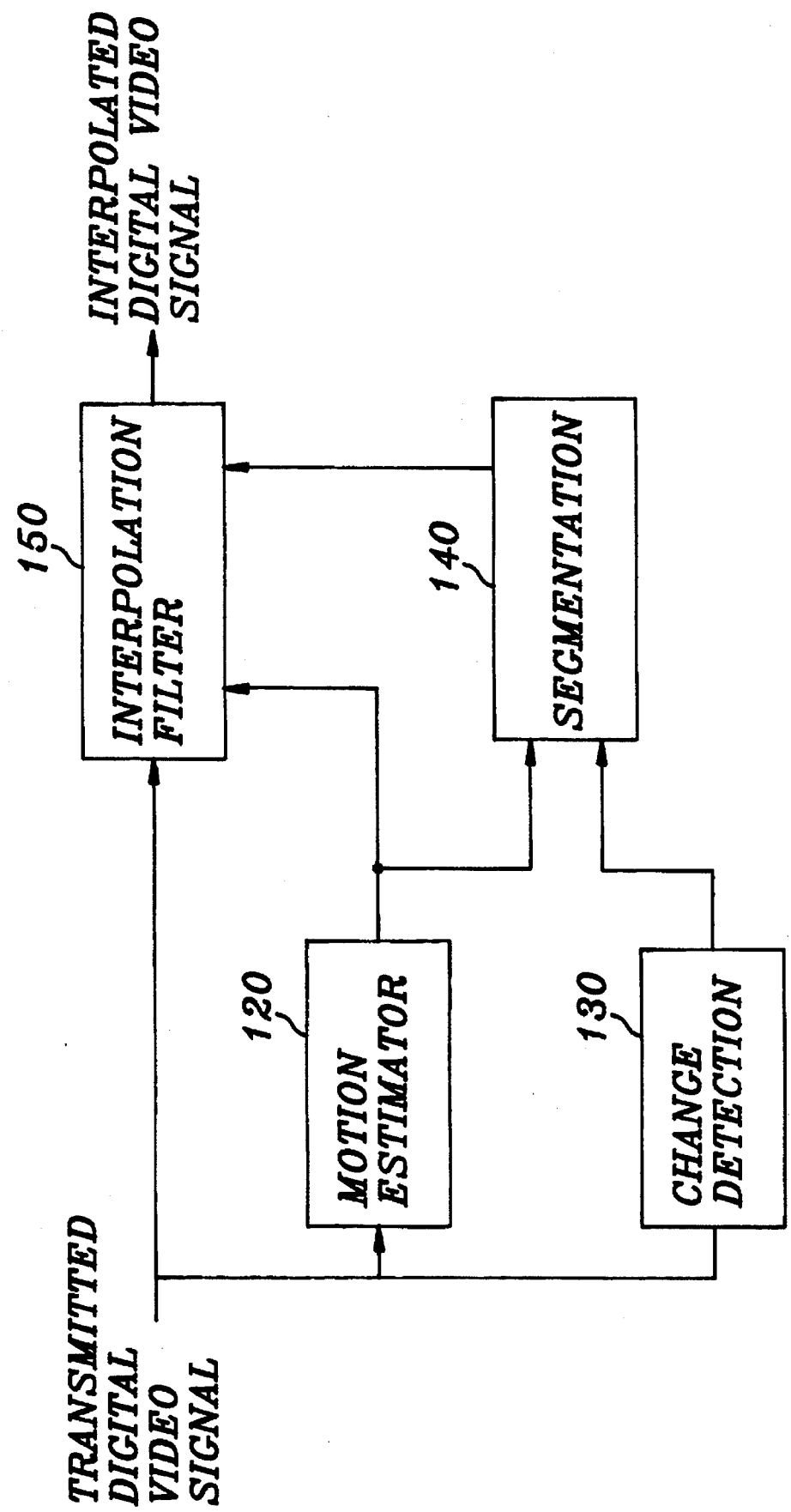
FIG. 1 shows a block diagram of a conventional motion compensated interpolator of the digital video signals.
Figure 2:
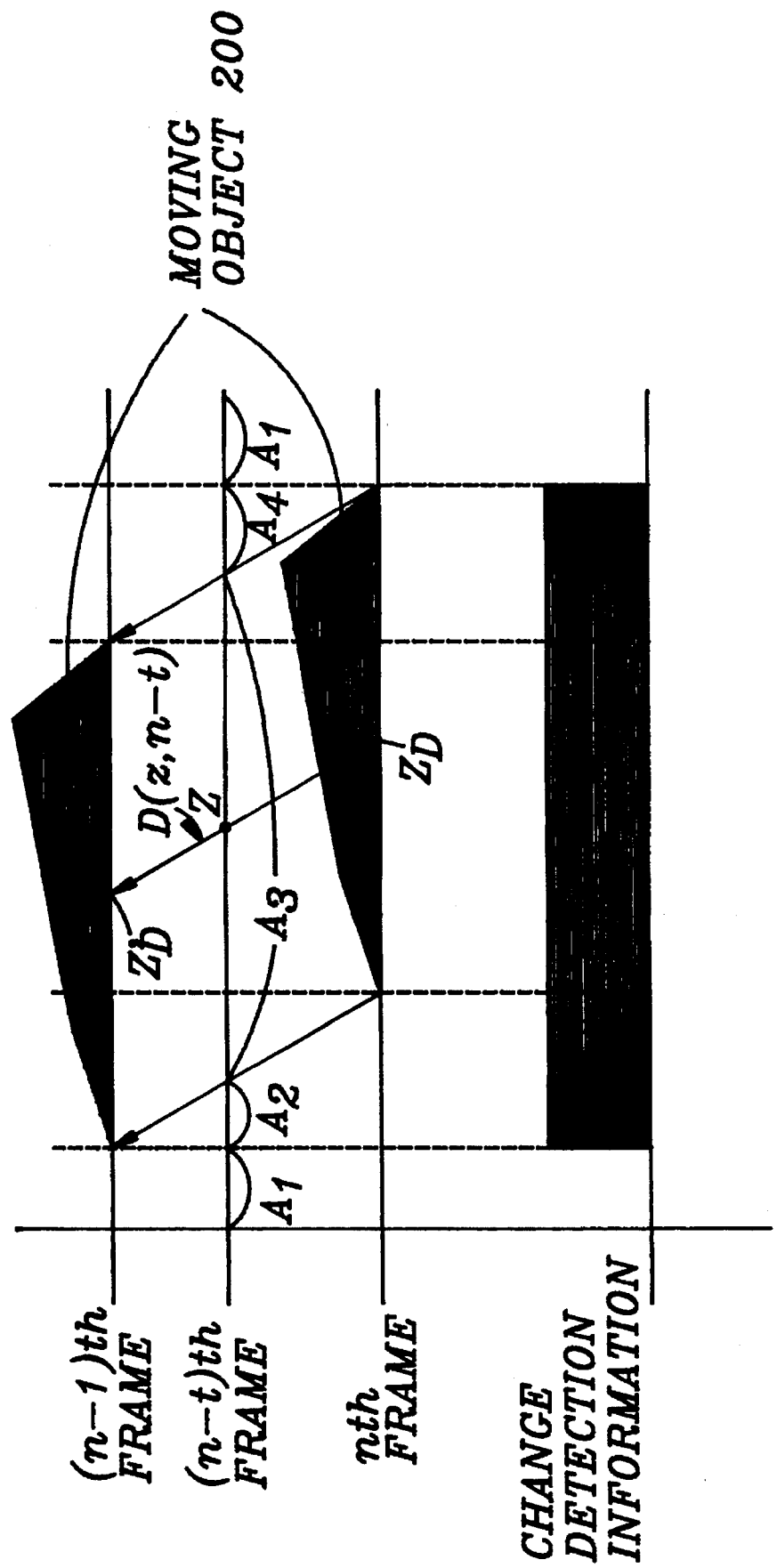
FIG. 2 illustrates the segmentation method carried out by the segmentation block shown in FIG. 1.
Figure 3:
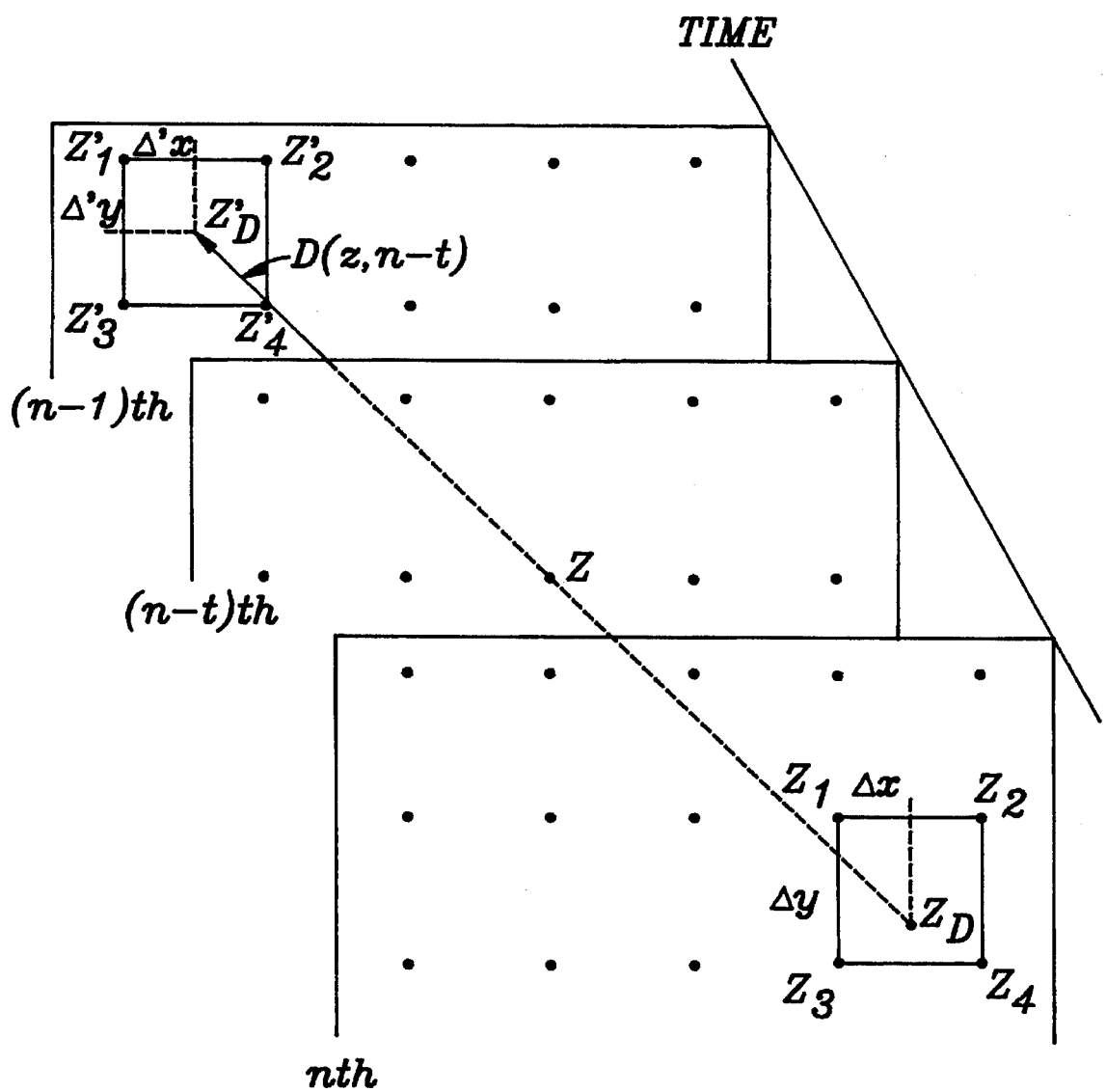
FIG. 3 depicts a conventional motion compensated interpolation scheme.

In accordance with the present invention, the interpolation filter 150 shown in FIG. 1 is implemented by a pair of 2-dimensional filters, both of which have a systolic array structure.

Since the systolic array structure has both modularity and regularity incorporated therein, it is as well as being suitable for simple, massive and repetitive computations such as a convolution operation but is also suitable for a real-time processing and hardware realization. More detailed description of the systolic array is described in an article authored by M. A. Sid-ahmed, "A Systolic Realization for 2-D Digital Filters", *IEEE Transactions on Acoustics, Speech and Signal Processing*, Vol. 37, No. 4, pp. 560–565 (April 1989).

In order to transform Eq. (4) representing the interpolated pixel value at pixel position z in the (n–t)th frame into a suitable form for the systolic array, Eqs. (5) and (6), which represent the interpolated pixel values at $z_D$ and $z_D'$ in the nth and the (n–1)th frames, respectively, are modified by defining factors thereof as:

$$\Delta_x = |t \cdot dx(x, y, n-t)| - \lfloor |t \cdot dx(x, y, n-t)| \rfloor,$$

$$\Delta_y = |t \cdot dx(x, y, n-t)| - \lfloor |t \cdot dy(x, y, n-t)| \rfloor,$$

$$z_1 = (x - \lfloor t \cdot dx(x, y, n-t) \rfloor, y - \lfloor t \cdot dy(x, y, n-t) \rfloor),$$

$$z_2 = (x - \lfloor t \cdot dx(x, y, n-t) \rceil, y - \lfloor t \cdot dy(x, y, n-t) \rfloor),$$

$$z_3 = (x - \lceil t \cdot dx(x, y, n-t) \rfloor, y - \lfloor t \cdot dy(x, y, n-t) \rceil),$$

and $$z_4 = (x - \lceil t \cdot dx(x, y, n-t) \rceil, y - \lfloor t \cdot dy(x, y, n-t) \rceil),$$

wherein $dx(x, y, n-t)$ and $dy(x, y, n-t)$ denote x and y components of the motion vector $D(z, n-t)$, respectively, with z being expressed by x, y components; $\lfloor q \rfloor$ is the largest integer value which is less than or equal to the real number q; and $\lceil q \rceil$ is the smallest integer value which is greater than or equal to the real number q.

Similarly, $$\Delta_x' = |(1-t) \cdot dx(x, y, n-t)| - \lfloor |(1-t) \cdot dx(x, y, n-t)| \rfloor$$

$$\Delta_y' = |(1-t) \cdot dy(x, y, n-t)| - \lfloor |(1-t) \cdot dy(x, y, n-t)| \rfloor$$

$$z_1' = (x + \lfloor (1-t) \cdot dx(x, y, n-t) \rfloor, y + \lfloor (1-t) \cdot dy(x, y, n-t) \rfloor),$$

$$z_2' = (x + \lceil (1-t) \cdot dx(x, y, n-t) \rceil, y + \lceil (1-t) \cdot dy(x, y, n-t) \rceil),$$

$$z_3' = (x + \lfloor (1-t) \cdot dx(x, y, n-t) \rfloor, y + \lceil (1-t) \cdot dy(x, y, n-t) \rceil),$$

and $$z_4' = (x + \lceil (1-t) \cdot dx(x, y, n-t) \rceil, y + \lceil (1-t) \cdot dy(x, y, n-t) \rceil),$$

Eq. (4) may then be modified into a filter equation by using the following delta function.

$$\delta(n) = \begin{cases} 1 : n = 0 \\ 0 : \text{otherwise} \end{cases} \quad \text{Eq. (7)}$$

The weighted pixel value, which will be refereed to as WP1 hereinafter, of the intercepting point $z_D$ in the nth frame represented by the second term in Eq. (4) may then be described as:

$$WP1 = (1 - t) \cdot I(z - t \cdot D(z, n-t), n) = \quad \text{Eq. (8)}$$

$$\sum_{k_1=-N}^{N} \sum_{k_2=-N}^{N} \{(1-t) \cdot (1-\Delta_x) \cdot (1-\Delta_y) \cdot$$

$$\delta(k_1 - \lfloor t \cdot dx(x, y, n-t) \rfloor) \cdot \delta(k_2 + \lfloor t \cdot dy(x, y, n-t) \rfloor) \cdot$$

$$I(x + k_1, y + k_2, n) + (1-t) \cdot \Delta_x \cdot (1-\Delta_y) \cdot$$

$$\delta(k_1 + \lceil t \cdot dx(x, y, n-t) \rceil) \cdot \delta(k_2 + \lfloor t \cdot dy(x, y, n-t) \rfloor) \cdot$$

$$I(x - k_1, y - k_2, n) + (1-t) \cdot (1-\Delta_x) \cdot \Delta_y \cdot$$

$$\delta(k_1 + \lfloor t \cdot dx(x, y, n-t) \rfloor) \cdot \delta(k_2 + \lceil t \cdot dy(x, y, n-t) \rceil) \cdot$$

$$I(x + k_1, y + k_2, n) + (1-t) \cdot \Delta_x \cdot \Delta_y \cdot \delta(k_1 + \lceil t \cdot$$

$$dx(x, y, n-t) \rceil) \cdot$$

$$\delta(k_2 + \lceil t \cdot dy(x, y, n-t) \rceil) \cdot I(x + k_1, y + k_2, n)\},$$

wherein N is an integer and is larger than the maximum magnitude of the motion vector.

The first term in Eq. (4) representing the weighted pixel value, which will be referred to as WP2 hereinafter, of the intercepting point $z_D'$ in the (n–1)th frame may be defined as:

$$WP2 = t \cdot I(z + (1-t) \cdot D(z, n-t), n-1) = \quad \text{Eq. (9)}$$

$$\sum_{k_1=-N}^{N} \sum_{k_2=-N}^{N} \{t \cdot (1-\Delta_x') \cdot (1-\Delta_y') \cdot$$

$$\delta(k_1 - \lfloor (1-t) \cdot dx(x, y, n-t) \rfloor) \cdot \delta(k_2 - \lfloor (1-t) \cdot$$

$$dy(x, y, n-t) \rfloor) \cdot I(x - k_1, y - k_2, n-t) +$$

$$t \cdot \Delta_x' \cdot (1-\Delta_y') \cdot \delta(k_1 - \lceil (1-t) \cdot dx(x, y, n-t) \rceil) \cdot$$

$$\delta(k_2 - \lfloor (1-t) \cdot dy(x, y, n-t) \rfloor) \cdot I(x + k_1, y + k_2, n-1) +$$

$$t \cdot (1-\Delta_x') \cdot \Delta_y' \cdot \delta(k_1 - \lfloor (1-t) \cdot dx(x, y, n-t) \rfloor) \cdot$$

$$\delta(k_2 - \lceil (1-t) \cdot dy(x, y, n-t) \rceil) \cdot I(x + k_1, y - k_2, n-1) +$$

$$t \cdot \Delta_x' \cdot \Delta_y' \cdot \delta(k_1 - \lceil (1-t) \cdot dx(x, y, n-t) \rceil) \cdot$$

$$\delta(k_2 - \lceil (1-t) \cdot dy(x, y, n-t) \rceil) \cdot I(x - k_1, y - k_2, n-1)\}$$

Therefore, Eqs. (8) and (9) can be expressed by the following filter equations.

$$WP1 = \quad \text{Eq. (10)}$$

$$\sum_{k_1=-N}^{N} \sum_{k_2=-N}^{N} h_1(k_1, k_2 | D(k, y, n-t)) \cdot$$

$$I(x + k_1, y + k_2, n)$$

and $$WP2 = \quad \text{Eq. (11)}$$

$$\sum_{k_1=-N}^{N} \sum_{k_2=-N}^{N} h_2(k_1, k_2) |$$

$$(D(x, y, n-t)) \cdot I(x + k_1, y - k_2, n-1)$$

wherein $h_1$ and $h_2$ are the filter coefficients and can be described as:

$$h_1(k_1, k_2 | D(x, y, n-t)) =$$

$$\begin{cases} (1-t)\cdot(1-\Delta_x)\cdot(1-\Delta_y) & : \begin{array}{l} k_1 = -\lfloor t\cdot dx(x,y,n-t) \rfloor \\ k_2 = -\lfloor t\cdot dy(x,y,n-t) \rfloor \end{array} \\ (1-t)\cdot\Delta_x\cdot(1-\Delta_y) & : \begin{array}{l} k_1 = -\lceil t\cdot dx(x,y,n-t) \rceil \\ k_2 = -\lfloor t\cdot dy(x,y,n-t) \rfloor \end{array} \\ (1-t)\cdot(1-\Delta_x)\cdot\Delta_y & : \begin{array}{l} k_1 = -\lfloor t\cdot dx(x,y,n-t) \rfloor \\ k_2 = -\lceil t\cdot dy(x,y,n-t) \rceil \end{array} \\ (1-t)\cdot\Delta_x\cdot\Delta_y & : \begin{array}{l} k_1 = -\lceil t\cdot dx(x,y,n-t) \rceil \\ k_2 = -\lceil t\cdot dy(x,y,n-t) \rceil \end{array} \\ 0 & : \text{otherwise} \end{cases}$$

and $$h_2(k_1, k_2 \mid D(x, y, n-t)) =$$

$$\begin{cases} t\cdot(1-\Delta_x')\cdot(1-\Delta_y') & : \begin{array}{l} k_1 = -\lfloor (1-t)\cdot dx(x,y,n-t) \rfloor \\ k_2 = \lfloor (1-t)\cdot dy(x,y,n-t) \rfloor \end{array} \\ t\cdot\Delta_x\cdot(1-\Delta_y') & : \begin{array}{l} k_1 = \lceil (1-t)\cdot dx(x,y,n-t) \rceil \\ k_2 = \lfloor (1-t)\cdot dy(x,y,n-t) \rfloor \end{array} \\ t\cdot(1-\Delta_x')\cdot\Delta_y' & : \begin{array}{l} k_1 = \lfloor (1-t)\cdot dx(x,y,n-t) \rfloor \\ k_2 = \lceil (1-t)\cdot dy(x,y,n-t) \rceil \end{array} \\ t\cdot\Delta_y'\cdot\Delta_y' & : \begin{array}{l} k_1 = \lceil (1-t)\cdot dx(x,y,n-t) \rceil \\ k_2 = \lceil (1-t)\cdot dy(x,y,n-t) \rceil \end{array} \\ 0 & : \text{otherwise} \end{cases}$$

Eqs. (10) and (11) adequately describe a 2-D filter having a systolic array structure with a "(2N+1)·(2N+1)" filtering window and its center positioned at $z(x, y)$. The filter expressed by Eqs. (10) and (11) is a conditional filter whose filtering coefficients are changed by the motion vector $D(z, n-t)$.

Referring to FIG. 4, there is illustrated, in accordance with the present invention, a motion compensated interpolation filter comprising a pair of 2-D filters 420, 430 having an identical systolic array structure. The segmentation information and the motion vector $D(x, y, n't)$ for the pixel at $z(x, y)$ are fed to the filters 420 and 430. The filter 420 calculates WP1, the weighted pixel value of $z_D$ in the nth frame, from pixels residing at the 2-D filter 420 based on the inputted segmentation information and the motion vector $D(x, y, n't)$. In a similar manner, WP2, the weighted pixel value of $z_D'$ in the (n−1)th frame, is derived by the filter 430 from pixels residing therein.

Hereinafter, the 2-D filters 420 and 430 will be described in detail using FIGS. 5a to 7b and further, for the sake of simplicity, the descriptions will be given with respect to the case of N=2. The calculated weighted pixel values WP1 and WP2 from the filter 420 and 430 are added at an adder 440 to thereby generate an interpolated pixel value $I(x, y, n-t)$ of the pixel located at $z(x, y)$ in the (n−t)th frame.

Figure 5B:
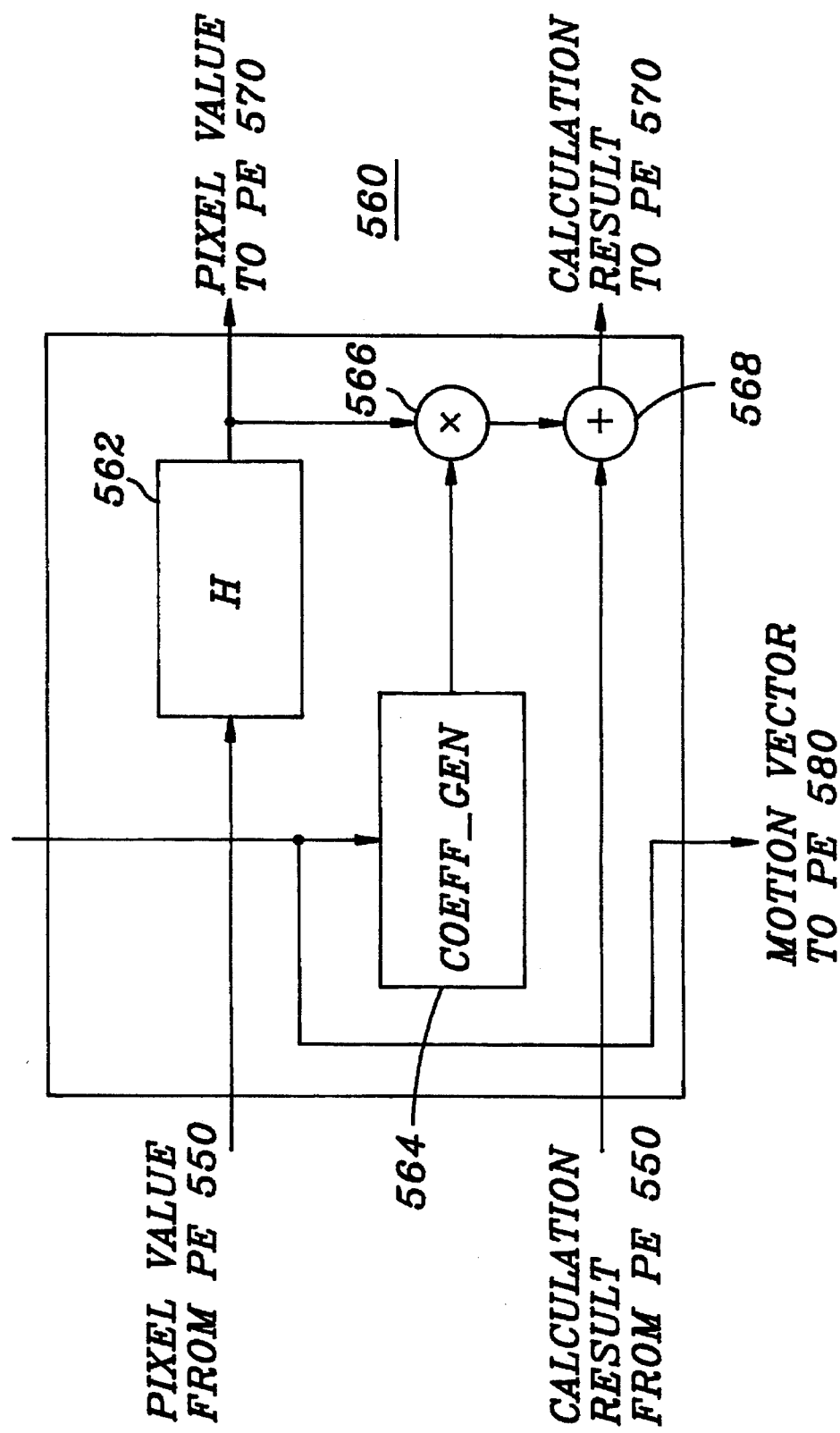

FIG. 5a shows a block diagram of the 2-D filter constituting the filter 420 and/or 430 whereto the derived Eqs. (10) and (11) can be directly applied, and FIG. 5b depicts a block diagram showing an internal structure of a processing element (PE), e.g., 560, shown in FIG. 5a surrounded by a PE 540 representing a upper stage of PE 560, a PE 550 representing the previous stage of PE 560, a PE 580 representing the lower stage of PE 560. In FIGS. 5a and 5b, each of "L" blocks, e.g., 530, is a line delay which delays the input digital signal by a line period, and each "H" block in each of PEs, e.g., the block 562 in FE 560, is a pixel delay which delays the input digital signal by one pixel clock. A block 510 shown in FIG. 5a delays the input motion vector $D(x, y, n-t)$ by the time interval "2L+2H" and then transmits the delayed motion vector $D(x, y, n-t)$ to all PEs simultaneously. A coordinate marked on each PE represents the displacement of a pixel residing in each PE from the pixel in PE 560.

Referring to FIG. 5a, a block 505, representing a row in the filter 500, has the similar structure and function to the 1-dimensional finite impulse response (1-D FIR) filter, i.e., PEs in the block 505 are cascaded horizontally. All the rows of the filter 500 have the same structure and function as the block 505 and are cascaded vertically to form a 2-D FIR filter as shown in FIG. 5a. The Weighted pixel value WP1 or WP2 is obtained by adding the results of the calculation carried out by each row in the filter 500.

The pixel data, $I(x, y, n)$ or $I(x, y, n-1)$ are fed to the input point 520 by using a conventional raster scan scheme capable of scanning the pixel date one by one from the top left corner to the bottom right corner of the frame. Such a raster scan scheme, as well as not requiring random accessibility, does not requires a special type of frame memory such as a high speed RAM or a multi-port RAM, but requires rather a simple frame memory capable of generating pixel data serially.

When the pixel value $I(x, y, n)$ or $I(x, y, n-1)$ fed to the input point 520 is transferred to PE 560 located at the center of the filter 500, the motion vector $D(x, y, y-t)$ is to be fed concurrently to each PE in the filter 500 thereby generating the filter coefficients and calculating the weighted pixel value WP1 or WP2. The time interval for a pixel fed to the input point 520 to be transferred to PE 560 at the center of the filter 500 is "2L+2H", and accordingly, the delay time of delay 510 is "2L+2H".

FIG. 5b illustrates a block diagram of PE 560 comprising: a pixel delay 562 which delays the input pixel value from PE 550 by one pixel clock and transfers the delayed pixel data to a multiplier 566 and PE 570; a filter coefficient generator (COEFF_GEN) 564 for generating a filter coefficient based on the motion vector from PE 540, the motion vector being transferred to PE 580; a multiplier 566 which multiplies the pixel value from the pixel delay 562 and the filter coefficient from COEFF_GEN 564 to thereby generate a weighted pixel value; and an adder 568 which adds the weighted pixel value from the multiplier 566 and calculation result from the adder (not shown) in PE 550 and transfers the result of the addition to PE 570. COEFF_GEN 564 can be implemented by, e.g., a look-up table (LUT).

The total processing time for the filter 500 is expressed as:

$$T_{coeff\_Gen} + T_{MUL}T_{ADD}\cdot(2N+1) + T_{ADD}\cdot 2N \qquad \text{Eq. (12)}$$

wherein $T_{coeff\_Gen}$ is the processing time for generating a filter coefficient; $T_{MUL}$, for the multiplication; and $T_{ADD}$, for the addition.

According to Eq. (12), the total processing time increases with N and may be too long for such filter 500 to carry out all the processing within a pixel clock. This is a shortcoming of the filter 500 but can be easily solved by applying the temporal localization rule. There is provided detailed description of the temporal localization rule in an article authored by S. Y. Kung, "On Supercomputing with Systolic/Wavefront Array Processors", *Proceedings of the IEEE*, Vol. 72, No. 7, pp. 867–884 (July 1984).

Figure 6A:
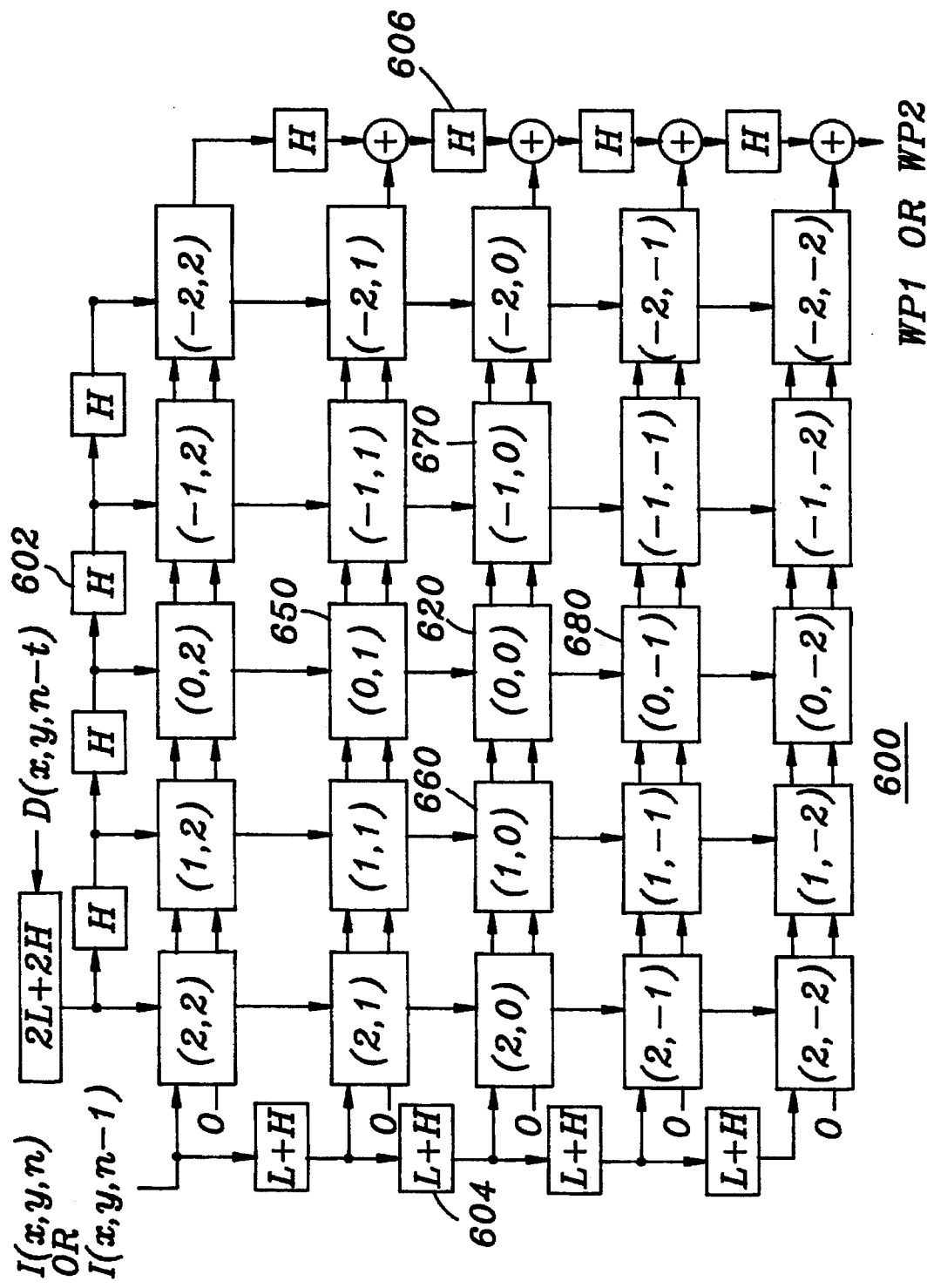
FIGS. 6a and 6b present a second embodiment of a 2-dimensional filter and a processing element thereof.
Figure 6B:
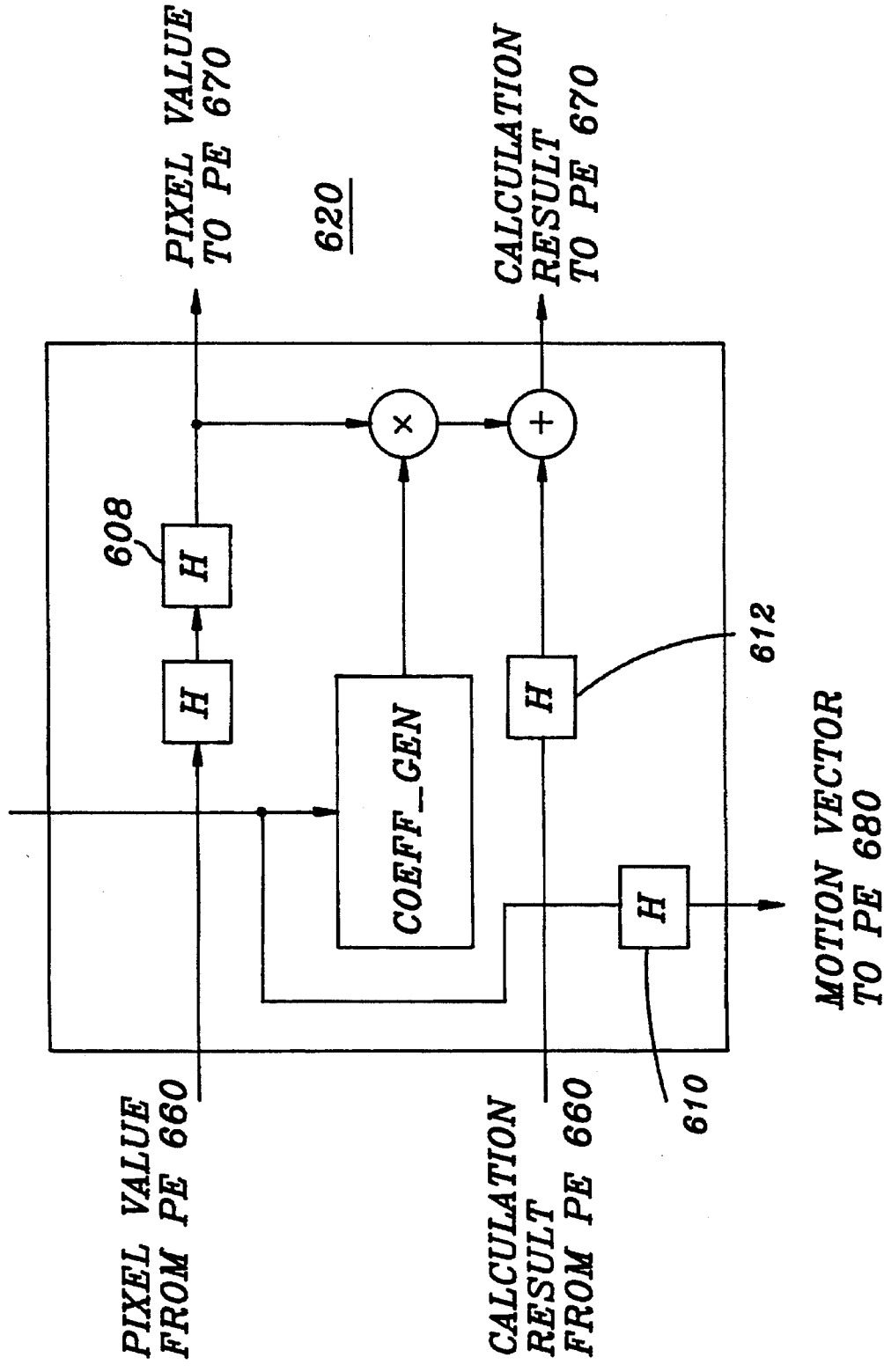

Referring to FIG. 6a, there is shown a block diagram of a 2-D filter 600 employing the temporal localization rule. FIG. 6b shows an internal structure of a processing element (PE), e.g., 620, in the filter 600 which is surrounded by a PE 650 representing a upper stage of PE 620, a PE 660 representing the previous stage of PE 620, a PE 670 representing the next stage of PE 620 and a PE 680 representing the lower stage of PE 620.

The difference between the filter 500 and the filter 600 is an added pixel delay, e.g., in 604, and additional pixel delays, e.g., 602, 606, 608, 610 and 612, all of such pixel delays being employed in accordance with the temporal localization rule.

The total processing time of the filter 600 may be described as:

$$T_{Coeff\_Gen} + T_{MUL} + T_{ADD} \qquad \text{Eq. (13)}$$

According to Eq. (13), although the group delay time of the filter 600 is larger than that of the filter 500, the total processing time of the filter 600, as well as being independent of N, is substantially reduced and may be short enough to carry out a real-time operation.

Figure 7A:
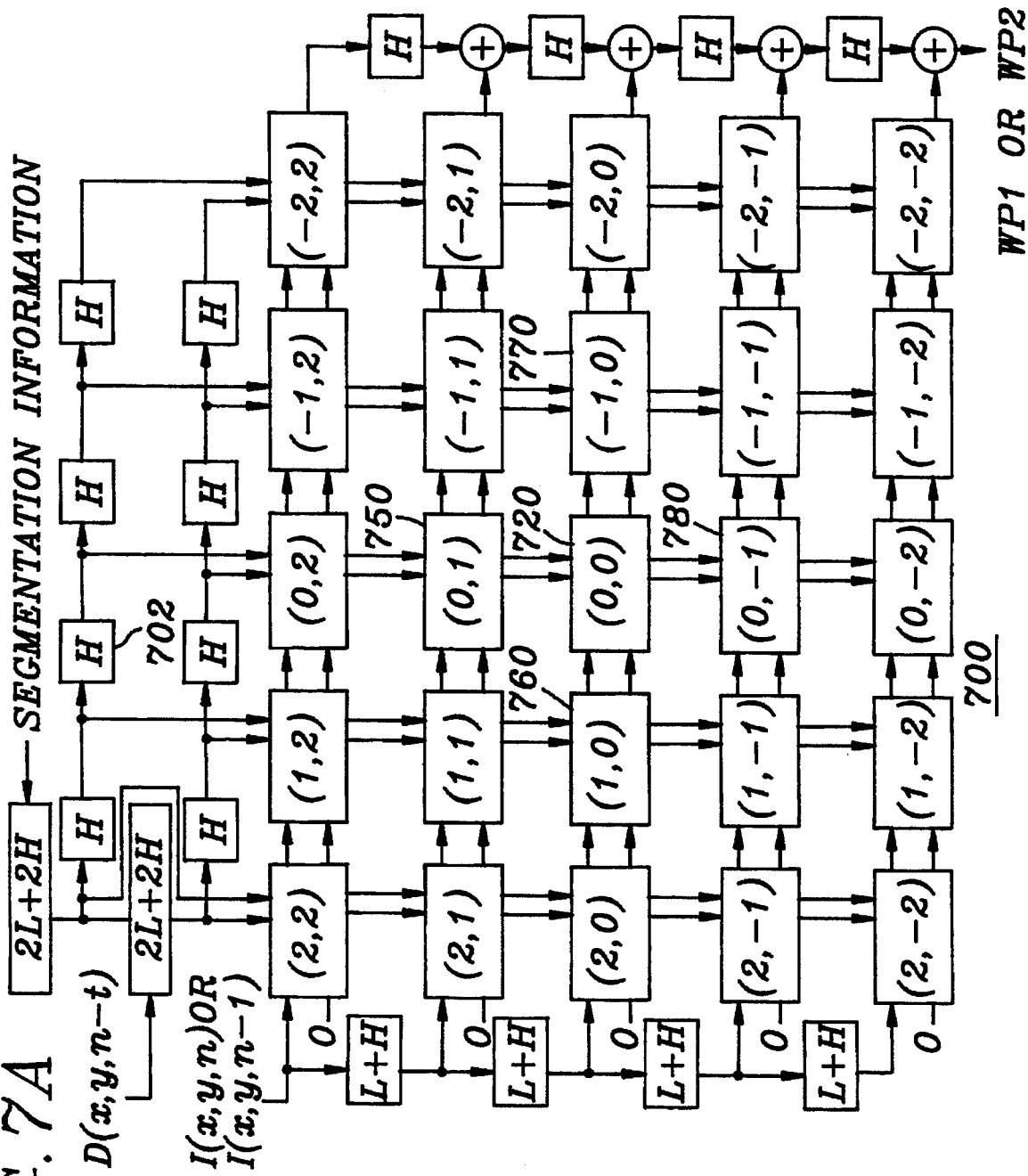
FIGS. 7a and 7b provide a third embodiment of a 2-dimensional filter and a processing element thereof.

FIG. 7a shows a block diagram of a modified version of a 2-D filter 700 operating with the segmentation information from segmentation block 140 shown in FIG. 1. The segmentation information is transmitted to each PE in the filter 700 in a similar manner to the motion vector D(x, y, n–t). The temporal localization rule is also applied on the path of the segmentation information and accordingly, a multiplicity of additional delays, e.g., 702, 710 and 732, is incorporated along the segmentation information path.

Figure 7B:
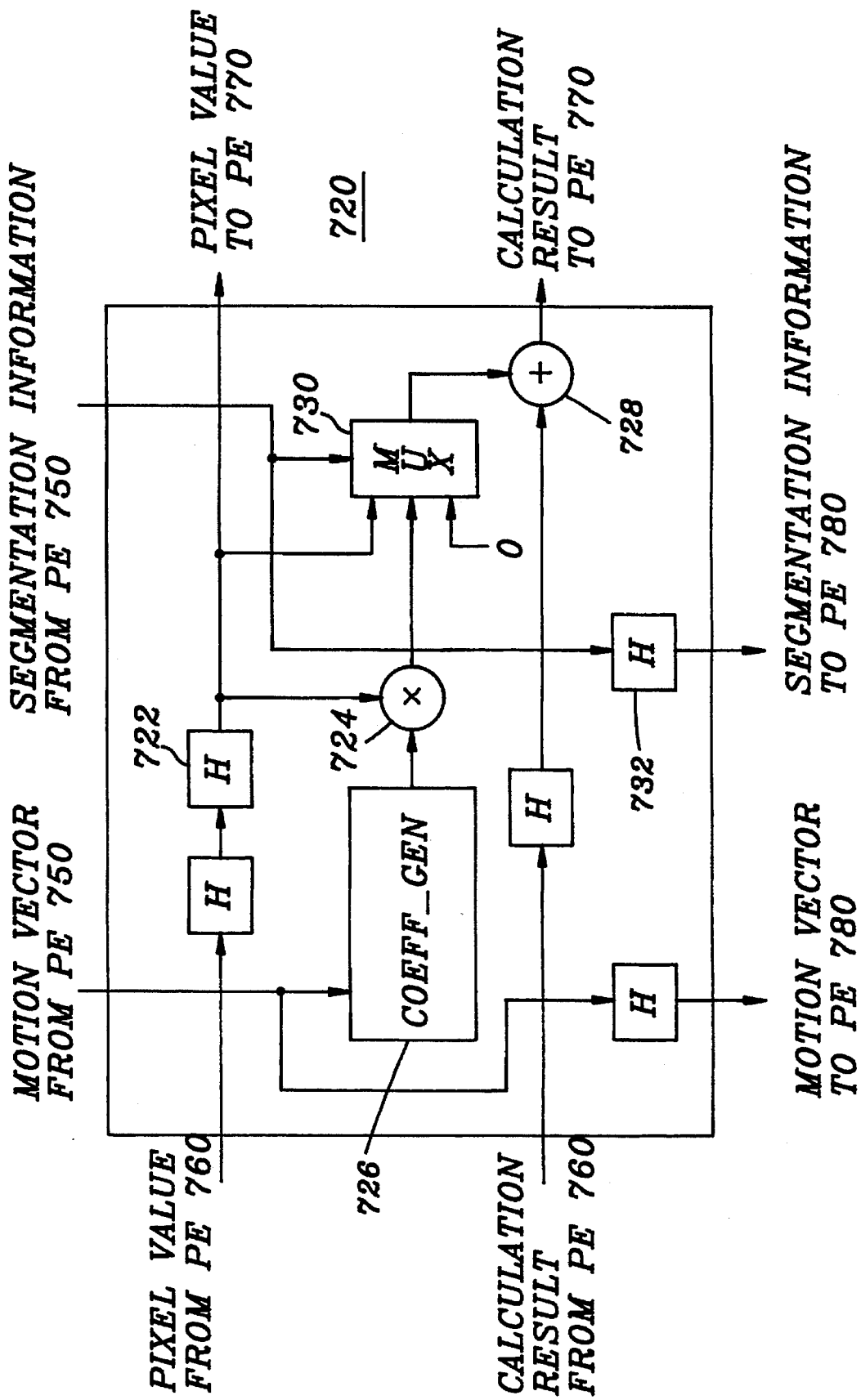

FIG. 7b illustrates an internal structure of PE, e.g., 720 in the filter 700 which is surrounded by a PE 750 representing a upper stage of PE 720, a PE 760 representing the previous stage of PE 720, a PE 770 representing the next stage of PE 720 and a PE 780 representing the lower stage of PE 720. A multiplexer (MUX) is added to PE 720, with an object of selecting one of the three inputs of a pixel value from the pixel delay 722, a calculated pixel value from the multiplier 724 and zero ("0") in response to the segmentation information inputted thereto.

If the segmentation information represents "SA", the input pixel of PE 720 belongs to the stationary area; if "CA", the covered area; if "UA", the uncovered area; and if "MA", the moving area.

MUX 730 operates as follows; if the segmentation information is "SA" or "MA", MUX 730 selects the output of a multiplier 724 and transmits this selected value to an adder 728.

If the segmentation information is "CA" and the filter 700 operates on the nth frame, MUX 730 selects "0" and transmits this value to the adder 728. If segmentation information is "CA" and the filter 700 operates on the (n–1)th frame, MUX 730 selects the pixel value from the pixel delay 722 and transmits it to the adder 728.

If the segmentation information is "UA" and the filter 700 operates on the (n–1)th frame, MUX 730 selects "0" and transmits this value to the adder 728. If the segmentation information is "UA" and the filter 700 operates on the nth frame, MUX 730 selects the pixel value from the pixel delay 722 and transmits it to the adder 728.

While the present invention has been described with reference to the particular embodiments, it will be apparent to those skilled in the art that various changes and modifications may be made without departing from the spirit and scope of the invention as defined in the following claims.

What is claimed is:

1. A motion compensated interpolation filter for generating an interpolated frame from a first frame and a second frame of video signals by using a motion vector for each pixel in the interpolated frame, wherein the first frame precedes the interpolated frame by a time interval T and the interpolated frame precedes the second frame by a time interval (1–T), said T being a rational number between 0 and 1, which comprises:

first means having a 2-dimensional systolic array structure for providing a first weighted pixel value for a current pixel of the interpolated frame, wherein the first weighted pixel value is a weighted sum of four pixels in the first frame which are located around a first estimation position shifted by the motion vector multiplied by T from a position of the current pixel of the interpolated frame, said first means including (2N+1)·(2N+1) processing elements wherein each of a block of (2N+1)·(2N+1) pixels of the first frame is inputted to each of the processing elements, N being a predetermined integer; and each of the processing elements generates one of a first set of filter coefficients, in response to the motion vector of the current pixel of the interpolated frame and the pixel of the first frame inputted thereto, which is proportional to T if the pixel of the first frame inputted thereto is located around the first estimation position, or is 0, if otherwise;

second means having a 2-dimensional systolic array structure for providing a second weighted pixel value for the current pixel of the interpolated frame, wherein the second weighted pixel value is a weighted sum of four pixels of the second frame which are located around a second estimation position shifted by the motion vector multiplied by (1–T) from the position of the current pixel of the interpolated frame, said second means including (2N+1)·(2N+1) processing elements, wherein each of a block of (2N+1)·(2N+1) pixels of the second frame is inputted to each of the processing elements, N being a predetermined integer; and each of the processing elements generates one of a second set of filter coefficients, in response to the motion vector of the current pixel of the interpolated frame and the pixel of the second frame inputted thereto, which is proportional to (1–T) if the pixel of the second frame inputted thereto is located around the second estimation position, or is 0, if otherwise;

means for adding the first and the second weighted pixel values to thereby generate a value of the current pixel of the interpolated frame; and wherein the interpolated frame is generated by further using segmentation information for each pixel in the interpolated frame and the first weighted pixel value is rendered 0 if the segmentation information of the current pixel of the interpolated frame represents a covered area and the second weighted pixel value is rendered 0 if the segmentation information of the current pixel of the interpolated frame represents an uncovered area.

* * * * *